United States Patent [19]

Clark

[11] 4,429,759
[45] Feb. 7, 1984

[54] LATCH MECHANISM

[75] Inventor: Ray Clark, Pewaukee, Wis.

[73] Assignee: Applied Power Inc., Milwaukee, Wis.

[21] Appl. No.: 348,141

[22] Filed: Feb. 11, 1982

[51] Int. Cl.³ .............................................. B62D 27/06
[52] U.S. Cl. ................................ 180/89.14; 292/111;
292/129; 296/190; 296/35.1; 296/37.6
[58] Field of Search ..................... 296/190, 35.1, 37.6;
180/89.14, 89.15; 74/527; 285/277, 315, 316;
292/111, 129

[56] References Cited

U.S. PATENT DOCUMENTS

| | | | |
|---|---|---|---|
| 3,581,840 | 1/1971 | Hirst, Jr. et al. | 180/89.14 |
| 3,667,566 | 6/1972 | Hopkins | 180/89.15 |
| 3,825,295 | 7/1974 | Sanders et al. | 180/89.14 |
| 3,841,693 | 10/1974 | Reynolds | 180/89.14 |
| 4,061,393 | 12/1977 | Bloomstrom | 180/89.14 |
| 4,082,342 | 4/1978 | Ailshie et al. | 180/89.15 |
| 4,279,321 | 7/1981 | Stone | 180/89.14 |

Primary Examiner—Richard A. Bertsch
Attorney, Agent, or Firm—John J. Byrne; Bradford E. Kile

[57] ABSTRACT

Disclosed is a latching mechanism comprising (a) a plunger adapted to be mounted on a truck body or similar structure, (b) first means for extending and retracting the plunger, (c) a latch hook pivotally mounted on the truck body or similar structure in position to contact the plunger when it is retracted but not when it is extended, (d) a catch adapted to be mounted on a truck cab or similar structure in position to be engaged by the latch hook when the latch hook is contacted by the plunger, but not when the latch hook is not contacted by the plunger, and (e) means biasing the latch hook towards contact with the plunger.

8 Claims, 6 Drawing Figures

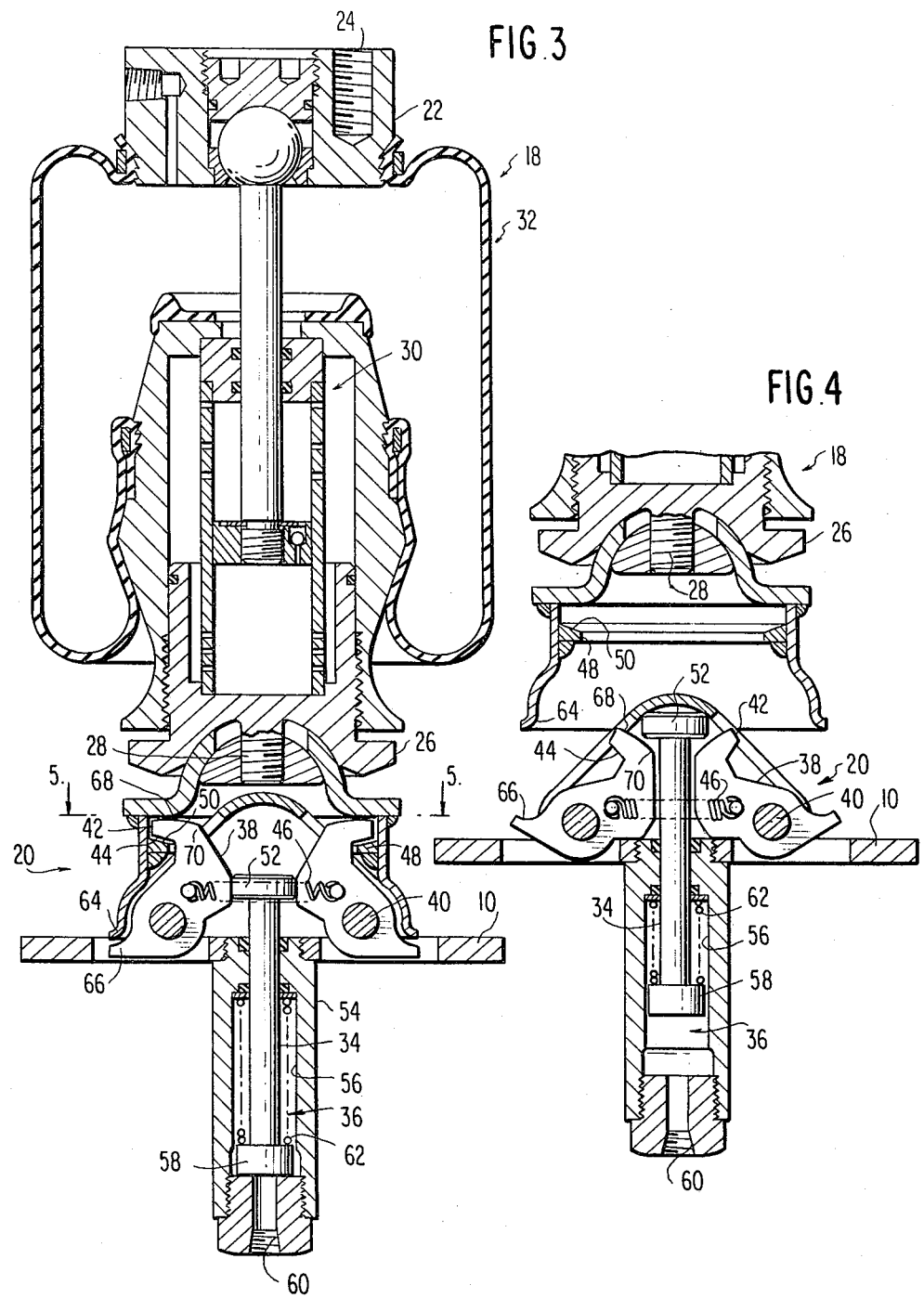

LATCH MECHANISM

TECHNICAL FIELD

This invention relates to a latch mechanism. Specifically, it relates to cab latch mechanisms for tilt cab trucks.

BRIEF SUMMARY OF THE INVENTION

A tilt cab latching mechanism according to the present invention comprises a plunger adapted to be mounted on either the chassis or the cab, first means for moving the plunger back and forth between a first position and a second position, at least one latch hook adapted to be mounted on the same member as the plunger for pivotal movement between a first position in which it is in contact with the plunger when the plunger is in its first position and a second position, second means for biasing the latch hook towards its second position, and a catch adapted to be mounted on the other of the cab or the chassis in position to be engaged by the latch hook when the latch hook is in its first position.

Particular features of this mechanism include (1) low overall height (on the order of two inches in a practical embodiment), (2) hydraulic actuation by the cab tilt system pressure, (3) pre-triggering of the latch hooks is prevented by a spring-loaded plunger which holds the hooks in the retracted position until the top half of the latch triggers the hooks, (4) the hooks are positively locked by the plunger in the down and locked position, and (5) the top portion can be rotated relative to the bottom portion without affecting latch performance.

BRIEF DESCRIPTION OF THE DRAWINGS

FIG. 3 is a view of the shock absorber and air spring assembly along the line 3—3 in FIG. 2, showing the latch mechanism closed.

FIG. 4 is a fragmentary view similar to FIG. 3, but showing the latch mechanism opened.

DETAILED DESCRIPTION OF THE PRESENTLY PREFERRED EMBODIMENT

Figure 1:
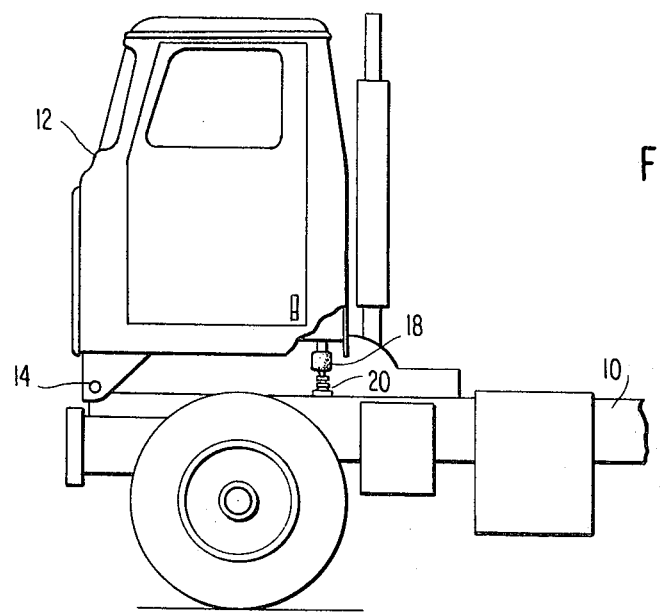
FIG. 1 is a side view of a tilt cab truck incorporating the present invention.
Figure 2:
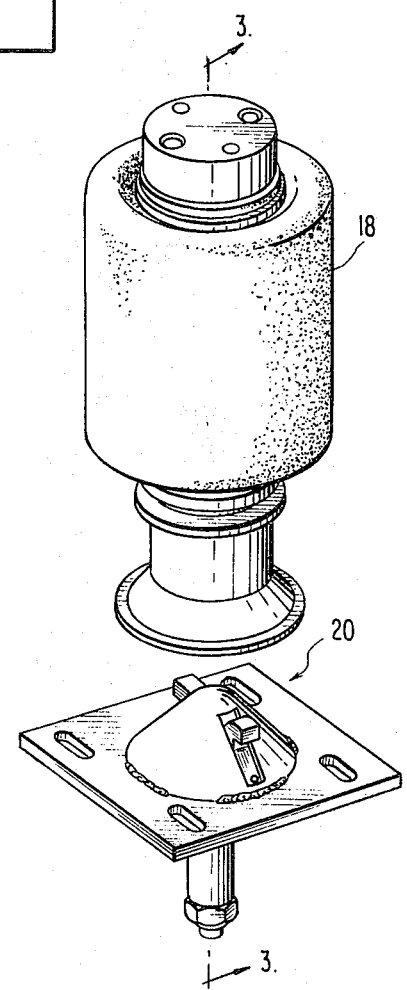
FIG. 2 is a perspective drawing of an integral shock absorber and air spring assembly and the latch mechanism.
Figures 5, 6:
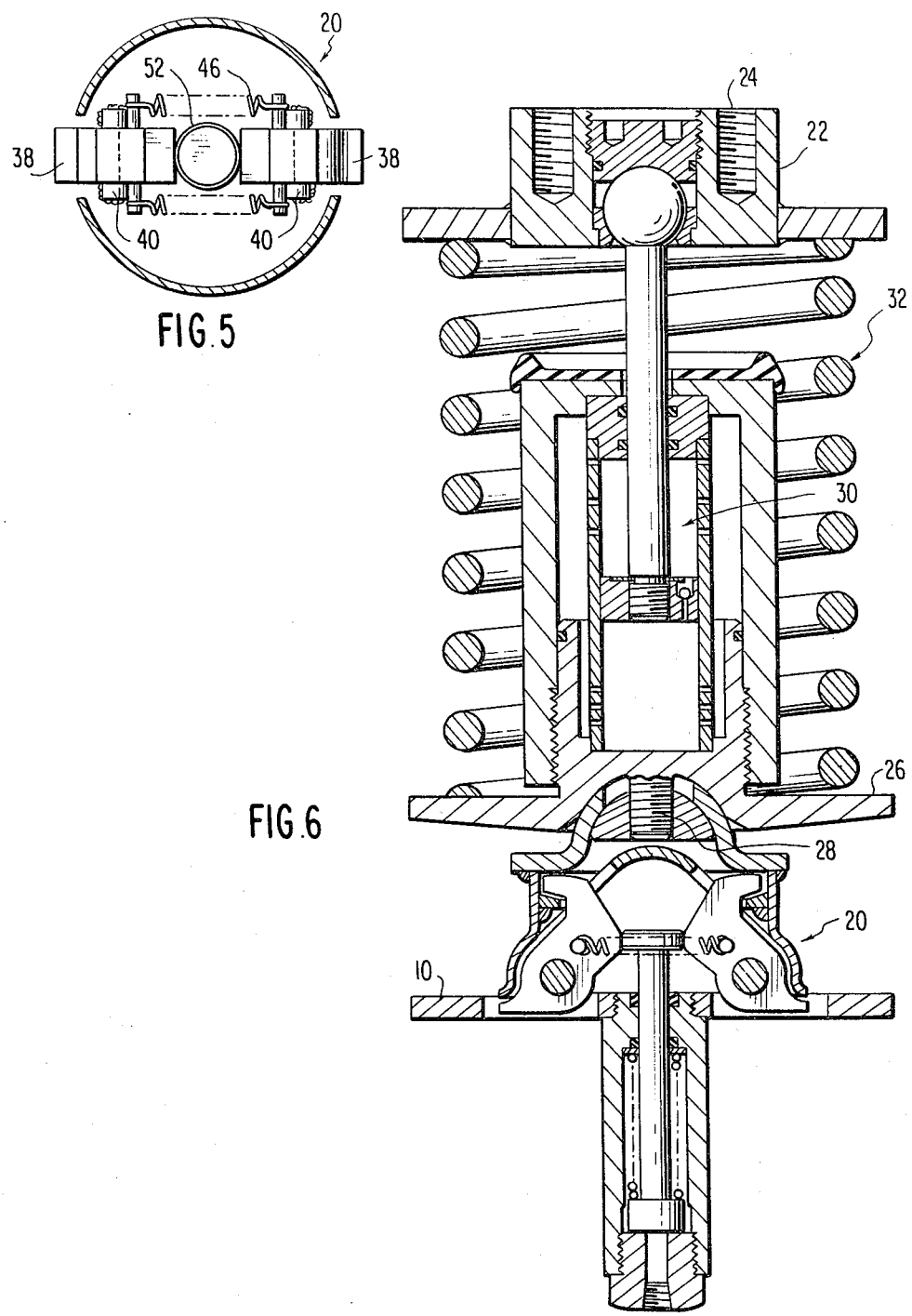
FIG. 5 is a view along the line 5—5 in FIG. 3.
FIG. 6 is a view similar to FIG. 3 of a second embodiment of the subject invention.

FIG. 1 shows a conventional tilt cab truck comprising an elongated chassis member 10, a cab member 12 mounted on the chassis member 10 for pivotal movement about an axis 14 transverse to the longitudinal axis of the chassis member 10 from a lowered first position (shown in FIG. 1) to a raised second position. A rear integral shock absorber and air spring assembly 18 is located at each of the rear corners between the chassis member 10 and the cab member 12. A latch mechanism 20 is located at each of the rear corners between the assembly 18 and the chassis member 10.

STRUCTURE OF THE ASSEMBLY 18

Turning to FIG. 3, it can be seen that the shock absorber and air spring assembly 18 has a first base 22 adapted to be attached to the cab member 12 by a plurality of bolts (not shown) threadedly received in bolt holes 24. A second base 26 is attached to the latch mechanism 20 by a bolt 28, a shock absorber sub-assembly 30, and an air spring sub-assembly 32. These assemblies are described in detail in application Ser. No. 332,189, filed Dec. 18, 1981, and application Ser. No. 06-339,305, filed Jan. 15, 1982, the disclosure of which is incorporated herein by reference.

STRUCTURE OF THE LATCH MECHANISM 20

The latch mechanism 20 secures the chassis member 10 to the cab member 12. The latch mechanism 20 includes a plunger 34 mounted on the chassis member 10 and means 36 for moving the plunger 34 back and forth between a first position and a second position. Two latch hooks 38 are also mounted on the chassis member 10 for pivotal movement about axes 40 between a first position in which they are in contact with the plunger 34 when it is in its first position and a second position in which they may be, but preferably are not, in contact with the plunger 34. The latch hooks 38 comprise latches 42 which have radially upwardly slanted lower surfaces 44, as best seen in FIG. 3. A spring 46 biases the latch hooks 38 towards their second position, and an annular catch 48 having a radially upwardly slanted upper surface 50 to match the radially upwardly slanted lower surface 44 on the latches 42 is mounted on the cab member 12 (in the illustrated embodiment, on the second base 26, which is mounted on the cab member 12) in position to engage the latches 42.

The plunger 34 has an enlarged head 52 which is in contact with the latch hooks 38 when they are in their first position (shown in FIG. 3). When the plunger 34 is moved from its first to its second position (shown in FIG. 4) by the means 36, the plunger 34 extends past the latch hooks 38, and the enlarged head 52 is no longer in contact with the latch hooks 38.

The plunger 34 extends into a housing 54 which depends from the upper surface of the chassis member 10. The housing 54 contains a bore 56, and the plunger 34 carries a piston 58 which is slidingly received in the bore 56. The fit between the piston 58 and the bore 56 may prevent passage of hydraulic fluid or, as shown, the fit can be loose enough to permit passage of hydraulic fluid. In the latter event, the presence of the plunger 34 in the bore 56 above the piston 58 ensures an upward differential pressure on the piston 58 even when hydraulic fluid at the same pressure fills the bore 56 on either side of the piston 58.

The means 36 causes the plunger 34 to move linearly. It comprises a path of fluid communication 60 and a compression spring 62. Hydraulic fluid is supplied to the bore 56 via the path of fluid communication 60 at the same time it is supplied to the tilt cylinders, and the hydraulic fluid in the bore 56 causes the plunger 34 to extend, permitting the spring 46 to pivot the latch hooks 38, releasing the annular catch 48, before the tilt cylinders pivot the cab member 12 relative to the chassis member 10. Once the cab member 12 has been moved to its raised position, the hydraulic pressure is released, and the plunger 34 moves downwardly slightly under the influence of the spring 62 until the enlarged head 52 comes to rest on the latch hooks 38.

When the cab member 12 is pivoted back to its lowered position, hydraulic fluid is not supplied to the bore 56. Just before the cab member 12 settles down onto the chassis member 10, an annular actuating skirt 64 adjacent to the annular catch 48 comes into contact with an extension 66 on each of the latch hooks 38. The extensions 66 are located on the opposite sides of the pivots 40 of the latch hooks 38 from latches 44, and the contact between the annular actuating skirt 64 and the extensions 66 causes the latch hooks 38 to rotate outwardly. Surfaces 68 of the latch hooks 38 are radial, so that rotation of the latch hooks 38 does not initially affect the position of the plunger 34, and only the frictional force between the surfaces 68 and the enlarged head 52 has to be overcome. However, once the inside points 70 of the surfaces 68 have passed the enlarged head 52, the enlarged head 52 is drawn downwards by the spring 62, meanwhile continuing to force the latch hooks 38 outwardly until the latch mechanism 20 again assumes the latched position shown in FIG. 3. In this position, the annular actuating skirt 64 may or may not be in contact with the extensions 66, and the enlarged head 52 is in contact with the latch hooks 38, holding the latch hooks 38 in engagement with the annular catch 48.

SECOND EMBODIMENT

FIG. 7 shows a second embodiment of the integral shock absorber and air spring assembly shown in FIG. 3. It is identical to the assembly shown in FIG. 3 except that the air bag has been replaced with a mechanical spring.

CAVEAT

While the present invention has been illustrated by detailed descriptions of two preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

I claim:

1. A mechanism for latching a first body to a second body, said mechanism comprising:
    (a) a plunger operable to be mounted on the first body;
    (b) first means for moving said plunger back and forth between a first position and a second position including,
    hydraulic means for forcing said plunger from its first position to its second position;
    (c) a pair of opposing latch hooks operable to be pivotably mounted on the first body symmetrically about said plunger for pivotal movement between a first, locking position in which said latch hooks are in contact with said plunger when said plunger is in its first position and a second retracted position;
    (d) catch means operable to be mounted on the second body in position for engagement by said latch hooks when said latch hooks are in a first, locking position;
    (e) said plunger having an enlarged head which is in contact with said latch hooks when said plunger is in its first position;
    (f) second means for biasing said latch hooks toward a second, unlocked position and withdrawing said latch hooks from contact with said catch means when said plunger is in its second position;
    (g) extension means formed on the opposite sides of the pivots of each of said latch hooks such that mechanical contact of said extension means will serve to pivot said latch hooks; and
    (h) mechanical actuating means connected to said catch means for mechanically engaging said extension means as said first and second bodies come into engagement and for pivoting said pair of opposing latch hooks into locking engagement with said catch means.

2. A mechanism for latching a first body to a second body as defined in claim 1 wherein:
    said catch means comprises an annular catch; and
    said actuating means comprises an annular skirt adjacent the annular catch for engaging said extension means of said latch hooks.

3. A mechanism for latching a first body to a second body as defined in claim 2 wherein:
    said annular catch having a radially inwardly slanted upper surface; and
    said pair of opposing latch hooks having a radially outwardly slanted lower surface for engaging said radially inwardly slanted upper surface of said annular catch.

4. A mechanism for latching a first body to a second body as defined in claim 1 or 3 wherein:
    said second means comprises at least one tension spring extending between said opposed latch hooks to bias said latch hooks toward each other and away from engagement with said catch means.

5. In a motor vehicle comprising:
    an elongated chassis member;
    a cab member mounted on said chassis member for pivotal movement about an axis transverse to the longitudinal axis of said chassis member from a lowered first position to a raised second position; and
    a releasable latching mechanism, the improvement comprising:
    (a) a plunger mounted upon one of said chassis member and said cab member;
    (b) first means, for moving said plunger back and forth between a first position and a second position including,
    hydraulic means for forcing said plunger from its first position to its second position;
    (c) a pair of opposing latch hooks pivotably mounted on said one of said chassis member and said cab member symmetrically about said plunger for pivotal movement between a first, locking position in which said latch hooks are in contact with said plunger when said plunger is in its first position and a second retracted position;
    (d) catch means operable to be mounted on the other of said chassis member and said cab member in position for engagement by said latch hooks when said latch hooks are in a first, locking position;
    (e) said plunger having an enlarged head which is in contact with said latch hooks when said plunger is in its first position;
    (f) second means for biasing said latch hooks toward a second, unlocked position and withdrawing said latch hooks from contact with said catch means when said plunger is in its second position;
    (g) extension means formed on the opposite sides of the pivots of each of said latch hooks such that mechanical contact of said extension means will serve to pivot said latch hooks into engagement with said catch means; and (h) mechanical actuating means connected to said catch means for mechanically engaging said extension means as said chassis and cab bodies come into engagement and for pivoting said pair of opposing latch hooks into locking engagement with said catch means.

6. In a motor vehicle as defined in claim 5 wherein said improvement further comprising:
said catch means comprises an annular catch; and
said actuating means comprises an annular skirt adjacent the annular catch for engaging said extension means of said latch hooks.

7. In a motor vehicle as defined in claim 6 wherein said improvement further comprising:
said annular catch having a radially inwardly slanted upper surface; and
said pair of opposing latch hooks having a radially outwardly slanted lower surface for engaging said radially inwardly slanted upper surface of said annular catch.

8. In a motor vehicle as defined in claims 5 or 7 wherein said improvement further comprising:
said second means comprises at least one tension spring extending between said opposed latch hooks to bias said latch hooks away from engagement with said catch means.

* * * * *